United States Patent
Grandjean et al.

(10) Patent No.: US 8,938,845 B2
(45) Date of Patent: Jan. 27, 2015

(54) LIQUID HEATING DEVICE WITH TWO FLOW PATHS FOR AN AUTOMOBILE

(75) Inventors: Denis Grandjean, Ablis (FR); Marcel Trebouet, Chavenay (FR)

(73) Assignee: Valeo Systèmes d'Essuyage, La Verriere (FR)

( * ) Notice: Subject to any disclaimer, the term of this patent is extended or adjusted under 35 U.S.C. 154(b) by 610 days.

(21) Appl. No.: 13/061,528

(22) PCT Filed: Sep. 7, 2009

(86) PCT No.: PCT/EP2009/006486
§ 371 (c)(1),
(2), (4) Date: Apr. 11, 2011

(87) PCT Pub. No.: WO2010/025957
PCT Pub. Date: Mar. 11, 2010

(65) Prior Publication Data
US 2011/0197384 A1    Aug. 18, 2011

(30) Foreign Application Priority Data
Sep. 5, 2008  (FR) ...................................... 08 04902

(51) Int. Cl.
*B60S 1/48*  (2006.01)
*F24H 1/12*  (2006.01)
(Continued)

(52) U.S. Cl.
CPC ................. *F24H 1/121* (2013.01); *B60S 1/488* (2013.01); *B60S 1/524* (2013.01); *B60S 1/603* (2013.01); *F24H 1/009* (2013.01); *F24H 9/1827* (2013.01)
USPC .................. 15/250.01; 15/250.02; 15/250.05; 15/250.04; 239/284.1; 219/202; 219/534; 219/541; 392/480; 392/479; 392/484

(58) Field of Classification Search
USPC ............... 15/250.05, 250.01, 250.02, 250.04; 219/200, 201, 202, 203, 534, 541; 392/465, 467, 471, 479, 484, 480, 482; 239/284.1
See application file for complete search history.

(56) References Cited

U.S. PATENT DOCUMENTS 1,418,011 A * 5/1922 Mehn ............................ 392/479
1,820,458 A * 8/1931 Jenkins ......................... 392/484
(Continued)

FOREIGN PATENT DOCUMENTS

EP    0 104 673 A2   4/1984
EP    1 857 338 A1   11/2007
(Continued)

OTHER PUBLICATIONS

International Search Report w/translation from PCT/EP2009/006486 dated Oct. 30, 2009 (6 pages).

*Primary Examiner* — Mark Spisich
*Assistant Examiner* — Andrew A Horton
(74) *Attorney, Agent, or Firm* — Osha Liang LLP (57) ABSTRACT

The invention relates to a liquid heating device for an automobile that comprises two independent liquid flow paths (10a, 10b) integrally formed in at least one part (1a) made of a heat-conducting material, each liquid flow path (10a) being capable of enabling a flow of liquid between a connection terminal defining an inlet and a connection terminal defining an outlet (12a, 12b), each of the connection terminals being capable of sealingly receiving a liquid supply duct or tube, and a heating means (14) thermally coupled with said part (1a) and capable of heating said part (1a) so that the liquid flowing through said flow paths can absorb the heat of said part (1a). The invention advantageously enables the very flexible use thereof for one or more systems requiring heated liquid inside a single vehicle.

19 Claims, 6 Drawing Sheets

(51) Int. Cl.
    *F24H 9/18*     (2006.01)
    *B60S 1/52*     (2006.01)
    *B60S 1/60*     (2006.01)
    *F24H 1/00*     (2006.01)

(56) References Cited

U.S. PATENT DOCUMENTS

| | | | | |
|---|---|---|---|---|
| 1,891,000 | A | * | 12/1932 | Lonergan ................... 392/479 |
| 2,529,215 | A | * | 11/1950 | Hicke ........................ 62/275 |
| 2,911,513 | A | * | 11/1959 | MacCracken ............... 392/341 |
| 3,031,563 | A | * | 4/1962 | Koester, Jr. ................ 392/479 |
| 3,523,576 | A | * | 8/1970 | Gibson, Jr. et al. .......... 165/47 |
| 3,665,154 | A | * | 5/1972 | Ando ......................... 392/469 |
| 4,177,375 | A | * | 12/1979 | Meixner ..................... 219/441 |
| 4,334,141 | A | * | 6/1982 | Roller et al. ................ 392/467 |
| 4,508,957 | A | * | 4/1985 | Rocchitelli ................. 392/479 |
| 4,687,907 | A | * | 8/1987 | Barkley et al. ............... 392/473 |
| 6,470,527 | B1 | * | 10/2002 | Boncoglu ................... 15/250.04 |
| 6,987,928 | B2 | * | 1/2006 | Shields ...................... 392/379 |
| 7,106,957 | B2 | * | 9/2006 | Abras et al. ................. 392/480 |
| 7,190,893 | B2 | | 3/2007 | Kuebler et al. |

FOREIGN PATENT DOCUMENTS

FR     2 404 983 A     4/1979
WO     2004/035358 A2     4/2004

* cited by examiner

FIG. 9

LIQUID HEATING DEVICE WITH TWO FLOW PATHS FOR AN AUTOMOBILE

REFERENCE TO RELATED APPLICATIONS

This application is a national stage application under 35 USC 371 of International Application No. PCT/EP2009/006486, filed Sep. 7, 2009, which claims the priority of French Application No. 08/04902, filed Sep. 5, 2008, the entire contents of which are incorporated herein by reference.

The present invention relates to a heating device for a quantity of liquid for an automobile and the various possible utilisations thereof.

The object of interest in the following is mainly but not exclusively the heating of a liquid for washing a glass surface in an automobile such as the windscreen, the back window or the external parts of the headlamps or headlights.

It is already known that an improved washing of the glass surfaces can be obtained by heating the washing liquid before it is sprayed onto the surface to be washed using one or several nozzles. A nozzle is a pressurised spraying orifice positioned at the level of the hood of an automobile as well as the spraying ramp directly integrated in a windscreen wiper. In addition, the heated washing liquid can also facilitate windscreen defrosting operations.

Various solutions have already been proposed in order to enable the rising of temperature of the windscreen washer liquid:

A first known solution consists in directly using the energy of the engine of the automobile to heat the washing liquid. The temperatures obtained are however too high, typically above 70° C., which creates the risks of causing serious burns to persons in the vicinity of the vehicle.

Another known solution consists in heating the liquid by using the energy of the radiator of the automobile. However this solution has been little used since it is necessary to wait for the engine to heat for some time before being effectively capable of raising the temperature of the washing liquid.

In a third solution considered, a resistance directly positioned in the washing liquid tank makes it possible to heat the liquid. However, this solution is not optimum because all the liquid contained in the tank must be heated each time, whereas only a small quantity of the liquid is taken, thus needlessly increasing the heating time and eventually destroying the intrinsic properties of the liquid.

The last known solutions consist in using a heating device positioned in the liquid flow path between the liquid tank and the nozzle or nozzles, thus making it possible to raise the temperature of a quantity of liquid taken from the tank when the control of the windscreen water is actuated, generally through the control lever positioned beside the wheel and controlling among other things the actuation of the windscreen wipers. Among these solutions, the heating proper is obtained either by a direct contact or by an indirect contact of a heating resistance with the liquid to be heated.

In the following, the object of interest is the heating mode by indirect contact, the other heating mode by direct contact having a main drawback in that the heating resistances used for directly heating the liquid are at extremely high temperatures which locally results in a vaporisation of the liquid.

A windscreen washing liquid heating device with an indirect contact is more particularly known from document U.S. Pat. No. 7,190,893, wherein electric heating devices are contacted with a mass made of a heat-conducting material so as to heat this mass. A liquid flow path between an inlet and an outlet is directly provided in the mass. The liquid, when it flows down the flow path, then absorbs the heat of the mass.

The electric heating elements are composed of a plurality of heating electric resistances having a substantially cylindric shape, extending in parallel in the mass, preferably overmolded by the heat-conducting material forming the mass. The flow path is split in two portions placed in parallel on either side of the resistances, both portions being connected in series and communicating through an intermediate portion positioned in the middle of the mass. In this device, the two ends of the flow path integrally formed in the mass are each provided with a connection terminal making it possible to sealingly receive a liquid flow path from or to the device.

Then, the device such as described in document U.S. Pat. No. 7,190,893 includes only one inlet and only one outlet and thus can be used only in association with, on the one hand, the liquid tank and a single system which it delivers heated liquid to, such as a wiping system. In the case where several systems on the same automobile are desired to be supplied with a heated liquid, for example a windscreen wiping system and a back window wiping system, as many heating devices as systems must be provided.

The present invention aims at providing a new heating device remedying the above-mentioned drawbacks.

This object is reached according to the invention which provides for a liquid heating device for an automobile, characterised in that it includes two independent liquid flow paths integrally formed in at least one part of a heat-conducting material, each liquid flow path being capable of enabling the flow of the liquid between the connection terminal forming the inlet and the connection terminal forming the outlet, each one of the connection terminals being capable of sealingly receiving a flow conductor tube and in that the device further includes a heating means thermally coupled with said part capable of heating said part, so that the liquid flowing into the flow path can absorb the heat of said part.

The present invention also aims at various possible utilisations of the above-mentioned device.

In a first possible utilisation, the liquid heating device is associated with a single system provided in an automobile and including at least one nozzle. In this case, the connection terminals of one of the flow paths is connected to the unidirectional pump through a single liquid inlet duct, with one of the connection terminals of the flow path being connected to said nozzle through a single outlet duct, and the flow paths are connected in series by a connection duct which connects the remaining connection terminals of the two flow paths.

The liquid heating device can also be used in association with two different destinations of the same wiping system of a glass surface provided in an automobile and requiring receiving heated liquid. In this case, both flow paths are connected to a unidirectional pump through an inlet duct split in two parallel portions, with each portion being connected to one of the connection terminals of each one of both flow paths and the remaining connection terminals of the two flow paths are independently connected to each one of the two different destinations through two independent outlet ducts. The two different destinations can for example be two nozzles associated with two wipers of the same wiping system. As an alternative, one of the destinations can be a nozzle associated with a wiper, the other destination being the liquid tank from which the heating device is supplied.

The liquid heating device can also be used in association with a windscreen wiping system including at least one wiper provided with at least one nozzle, so as to enable the distribution of the liquid on a first side of the wiper during an ascending phase of the wiping, and at least one nozzle for enabling the distribution of the liquid on the other side of the wiper during the descending phase of the wiping. In this case, a connection terminal for each flow path is connected to a bidirectional pump through an inlet duct for alternatively receiving liquid according to the ascending or descending phase of the wiping depending on the direction of rotation of the pump, each one of the remaining connection terminals of the two flow paths being connected to the corresponding nozzle of the wiper through the outlet duct.

The liquid heating device can also be used in association with two independent systems, each including at least one nozzle. In this case, each flow path is used in association with one of the two systems with one independent inlet circuit being connected to one of the connection terminals of the flow path, and an independent outlet circuit connected to one of the connection terminals of the flow path.

The advantages as well as other properties of the invention will be examined in detail in the following description of an exemplary possible embodiment of the liquid heating device, according to the present invention, while referring to the figures, wherein:

FIG. 5b is an alternative solution with respect to FIG. 5a;

As mentioned above, the present invention consists in providing a liquid heating device for an automobile which includes two independent liquid flow paths, each liquid flow path being capable of enabling the flow of liquid between a connection terminal forming the inlet and the connection terminal forming the outlet, each one of the connection terminals being capable of sealingly receiving a liquid flow duct or tube and composing, depending on the utilisation cases of the inlets and/or outlets which are independent of the device. This arrangement gives very good flexibility to the use of the heating device as will be explained hereinunder in the present description, while referring to FIGS. 3 to 8 which schematically illustrate various utilisations of the device according to the invention.

As the heating principle implemented in the present invention further is indirect heating, the flow paths are provided to be integrally formed in one or several parts made of a heat-conducting material which are themselves capable of being heated by electric heating means, the liquid heating in each flow path being carried out by absorption of heat in these parts.

In one exemplary embodiment not shown in the appended figures, only one part can be used, of the same type as the one described in document U.S. Pat. No. 7,190,893 wherein long resistances are overmolded, however providing for, unlike what is described in this document, two flow paths integrally made in this part, which are independent and which have their own connection terminals forming an inlet and an outlet.

Differently, in the preferred embodiment which will now be described while referring to FIGS. 1, 2a to 2c, the liquid heating device for an automobile includes two substantially identical distinct parts 1a, 1b made of a heat-conducting material, with each one of the parts including a liquid flow path 10a, 10b integrally formed in the part in order to enable the flow of the liquid between a first end provided with a connection terminal 11a, 11b and a second end provided with a connection terminal 12a, 12b. Here, the first ends 11a, 11b are conventionally considered as being inlets for receiving the liquids before heating, and the second ends 12a, 12b are considered as outlets for delivering the heated liquid. As will appear in the following description made while referring to FIGS. 3 to 9, each one of the references 11a, 11b, 12a, 12c can in fact indifferently match one inlet or one outlet of the corresponding flow path, depending on the way the device is used.

For this purpose, each one of the connection terminals is capable of sealingly receiving a liquid flow duct or tube making it possible to connect the device on the one hand to a liquid tank, and on the other hand to one or several system(s) requiring heated liquid.

In order to facilitate the connections for the flow of the liquid, the various connection terminals are advantageously provided on the same side of both parts 1a and 1b.

Various materials can be used for manufacturing both parts, such as aluminium. For reasons which will appear in the following description, a material having both high heat-conductivity and electric-conductivity will preferably be used. In order to guarantee the sealing of the device, a cover sealingly closes each one of the parts 1a, 1b above the liquid flow path, as shown by reference 2a in FIG. 2c.

The device further includes heating means 14 in thermal contact with each one of both parts 1a, 1b used for indirectly heating the liquid flowing inside the two flow paths 10a, 10b. The heating means includes, in the non limitative exemplary embodiment shown, a plurality of flat stones 14 having a positive temperature coefficient, also called CTP ceramics, positioned as a matrix.

More precisely, each one of said parts 1a, 1b includes a planar bottom wall 15a, 15b extending in a plane parallel to the flow path 10a, 10b that it encloses, and a plurality of stones 14 having a positive temperature coefficient are positioned as a matrix on the same plane, in parallel and in thermal contact with each one of the bottom walls. The matrix, which, in the schematised example, includes six stones 14, is thus sandwiched between the two bottom walls 15a, 15b, for enabling an indirect heating of the liquid in both flow paths 10a, 10b. In order to favour the exchange between the heat-conducting material composing each one of the two parts 1a and 1b and the liquid, each flow path 10a, 10b preferably follows a track having the shape of a labyrinth, for example the shape of a spiral.

Other electric heating means could be used for heating the two parts 1a, 1b, such as for example overmolded long lineal resistances. However, using stones having a positive temperature coefficient has several advantages. First, the heating temperature obtained while electrically supplying this type of thermistance is self-limited. More precisely, such thermistance raise temperature until a substantially constant temperature value is obtained, which corresponds to the so-called self-regulation temperature. Thus, it is not necessary to provide for a particular control device for regulating such elements. In this case, it is advisable to choose stones so that their self-regulation temperature corresponding to the maximum temperature they can deliver whatever the supply at their terminals, corresponds to the temperature desired for heating the liquid.

In addition, to obtain the increase in temperature of a flat stone having a positive temperature coefficient, it is sufficient to electrically connect one of the surfaces thereof to a first direct voltage with the other surface receiving a second direct voltage, typically the mass. This is used in compliance with the invention to obtain a very compact structure as will now be explained in details:

More precisely, using a plurality of flat stones arranged as a matrix makes it possible to provide only two electrodes for the simultaneous electrical supply of all the stones. Then, a first electrode is placed opposite, and in electric contact, with all the first surfaces of the stones for receiving the first value of direct voltage, typically the voltage delivered by the battery of the vehicle, and a second electrode is positioned opposite, and in electric contact, with all the second surfaces of the stones, for receiving the value of a neutral voltage.

Figure 1:
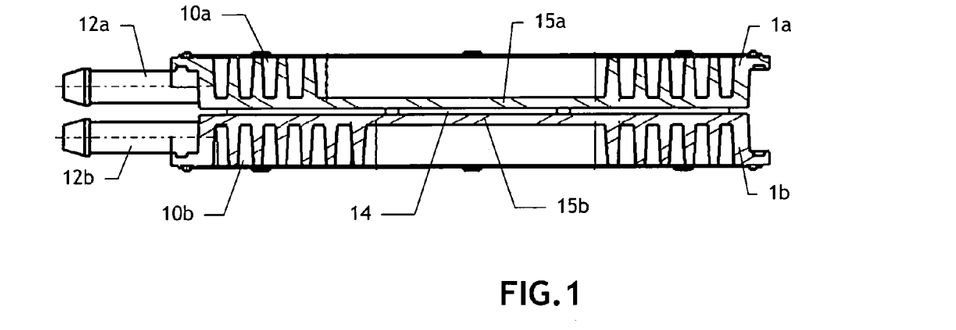
FIG. 1 illustrates a cross-section of the main elements composing a heating device according to one preferred embodiment of the invention.
Figure 2A:
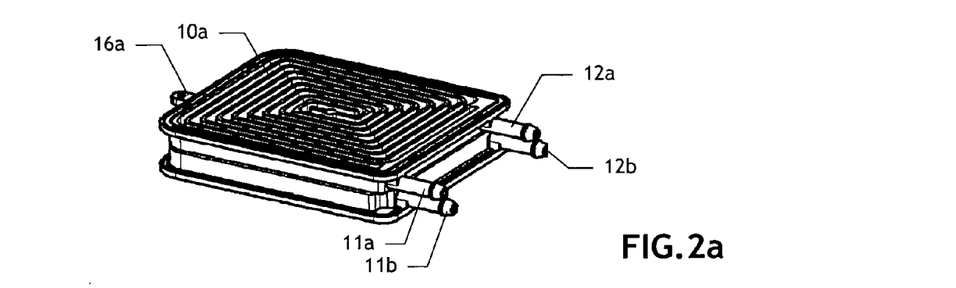
FIGS. 2a and 2b are respectively assembled and exploded perspective views of the various elements of the device in FIG. 1.
Figure 2B:
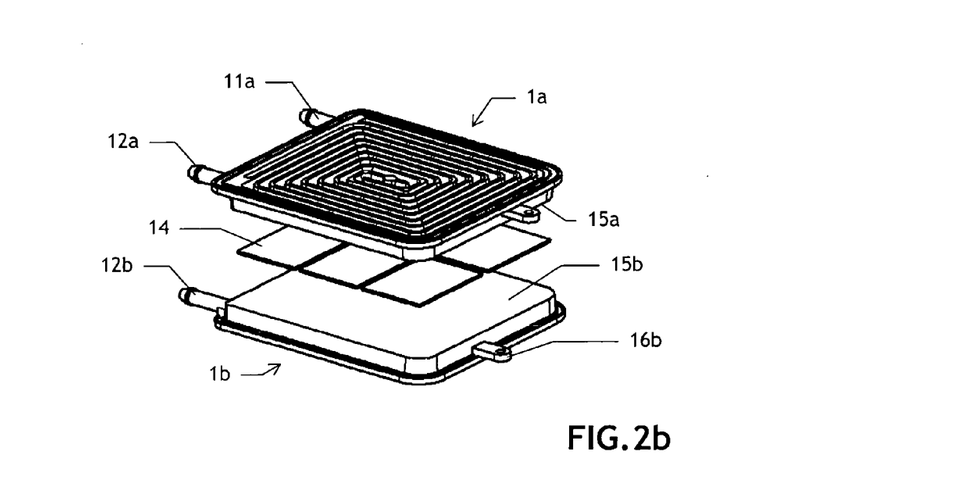
Figure 2C:
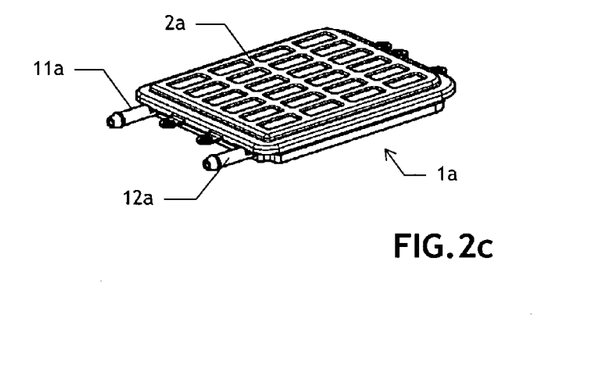
FIG. 2c is a perspective view of one of the parts of the device provided with a sealing cover.

In the exemplary embodiment shown in FIGS. 1, 2a and 2b, the supply electrodes are directly composed of the parts 1a and 1b. For this purpose, a material which can be both a very good heat conductor and a very good electric conductor is chosen, for example aluminium, for manufacturing both parts 1a and 1b. In this case, it is sufficient to place the surfaces of the flat stones in direct contact with respectively the bottom wall 15a of the part 1a and the bottom wall 15b of the part 1b. In addition, a connection terminal 16a, 16b integrally formed in each one of parts 1a, 1b is provided for connecting the parts respectively with the battery voltage and the mass. To ensure a correct contact, bottom walls 15a, 15b of the parts 1a, 1b are kept pressed against the surfaces of the stones using either screws for holding the parts 1a, 1b, or a layer of glue covering each side of the surfaces of the stones. In the case where screws are used, it can advantageously be considered to interpose between the surfaces of the stones and the bottom walls 15a, 15a a layer of electricity- and heat-conducting grease so as to make up for the difference in the geometry of the stones 14 and the unevenness for the bottom walls 15a, 15b and thus ensuring a good heat and electric contact. In the case where glue is used, the latter must have good heat-conduction properties and at least a small electric resistance. A layer of glue, as well as the previous layer of grease also makes it possible to advantageously make up for the difference in geometry of the stones 14 and the unevenness for the bottom walls 15a, 15b.

Other alternative implementations not shown can also be considered for the embodiment of the two supply electrodes. For example, each one of the first and second electrodes can be composed of a deformable and thin metal foil sandwiched between one of the surfaces of the matrix and the bottom wall of the first part or the second part. Each foil would then have an electrical connection terminal for receiving the first or the second direct voltage. In this alternative embodiment, the deformation capacity of the metal foil could advantageously make up for the difference in geometry of the stones and to provide for a uniform application of the electrodes on the surfaces.

Figure 3:
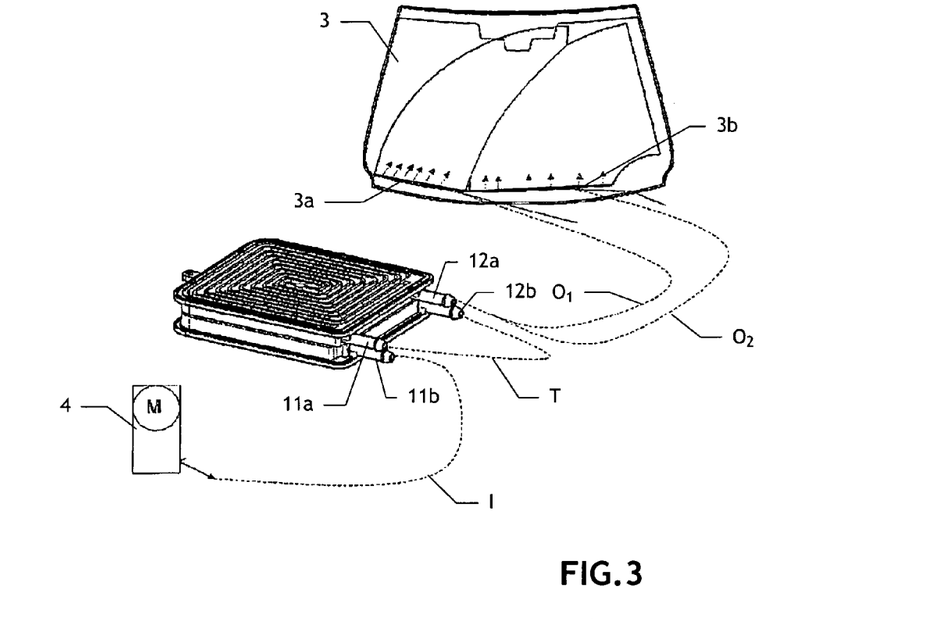
FIG. 3 illustrates a first possible utilisation of the device of the invention for the projection of the heated liquid onto a windscreen in association with a wiping system.

As seen hereabove, an essential characteristic of the present invention is to provide two independent liquid flow paths integrally formed in one or two pieces, with each flow path having its own inlet and its own outlet. Thanks to this arrangement, the same liquid heating device can be intended for several utilisations, some of which will now be described:

FIG. 3 describes a first possible utilisation of the device of the invention for the projection of a heated liquid onto a windscreen 3 of an automobile in association with a wiping system. In this utilisation, the device according to the invention is interposed between a liquid tank (not shown) and nozzles associated with two wipers 3a, 3b of the wiping system. For this purpose, one of the connection terminals of one of the flow paths, here the terminal 11b, is connected to the washing liquid tank through a unidirectional pump 4 and a single liquid supply duct I shown in dotted lines, whereas one of the connection terminals of the other flow path, here the connection terminal 12a, is connected to the nozzles of both wipers 3a, 3b of the glass wiping system through a single outlet duct O split in two parallel portions $O_1$, $O_2$, is also shown by dotted lines. In addition, the flow paths of the two pieces are connected in series through a connection duct T which connects the remaining connection terminals of both flow paths, here the connection terminal 12b with the connection terminal 11a. In this case, the heating device as such includes a single inlet, here the connection terminal 11b, and a single outlet, here the connection terminal 12a. In this utilisation, the heat exchange between the two parts and the liquid is thus increased thanks to a successive passage in the two flow paths. In the example shown in the diagram, each wiper 3a, 3b integrates a ramp of nozzles, but of course the principle remains the same for a nozzle associated with each wiper. The associated wiping system can also have one wiper in which case the single outlet duct O does not need being split in two parallel portions. More generally, the wiping system can be substituted by any system fitted on an automobile and including at least one nozzle for the diffusion of the heated liquid delivered by the heating device.

Figure 4:
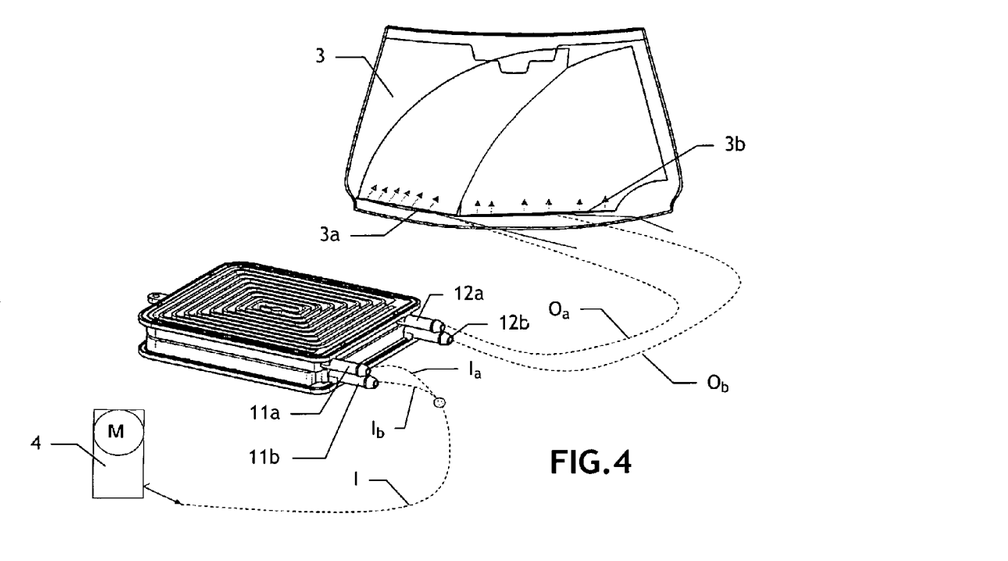
FIG. 4 is an alternative possible utilisation of the device of the invention for the projection of a heated liquid onto a windscreen in association with each wiper of a wiping system including two wipers.

FIG. 4 is an alternative possible utilisation of the device according to the invention, more particularly adapted for the projection of a heated liquid onto a windscreen in association with a wiping system including two wipers 3a, 3b. In this alternative solution, the liquid tank (not shown) is always brought by a unidirectional pump 4, but comes in parallel by an inlet duct I split in two parallel portions $I_a$, $I_b$, with each one of the portions being connected to one of the connection terminals of each one of the two flow paths, here the connection terminals 11a, 11b. The remaining connection terminals of the two flow paths, here the terminals 12a, 12b distribute the liquid independently from one or several nozzles associated with each one of the wipers 3a, 3b through two independent outlet ducts $O_a$, $O_b$. In this utilisation, the flow paths of the parts 1a and 1b are thus simultaneously used for distributing the heated liquid in parallel to either nozzle or to the nozzle group associated with each wiper.

Figure 5A:
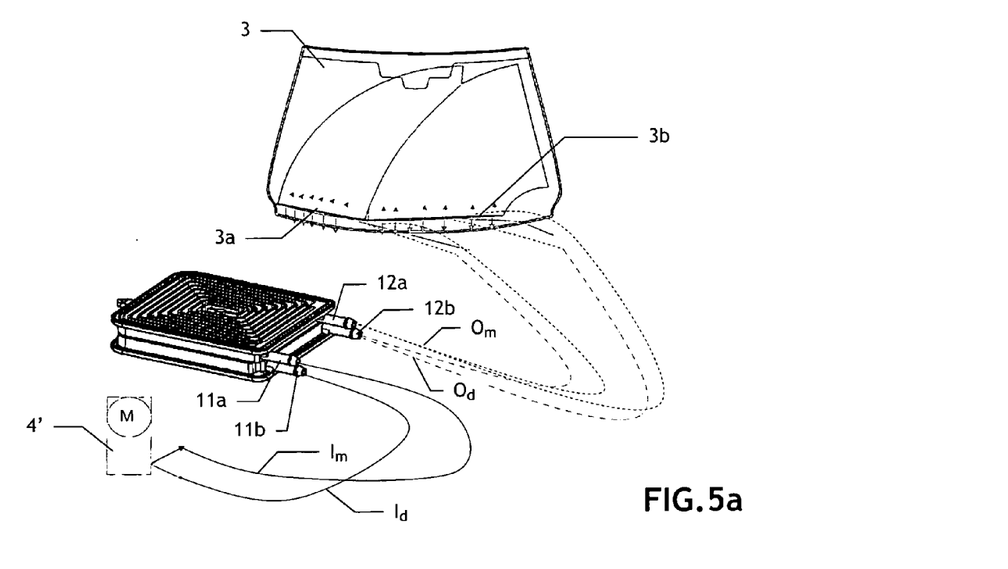
FIG. 5a is a second possible utilisation of the device according to the invention for the projection of a heated liquid onto a windscreen in association with the ascending and descending wiping phases of the wipers in a wiping system.

FIG. 5 illustrates a second possible utilisation of the heating device according to the invention in association with the windscreen wiping system 3 having two wipers 3a, 3b of the type wherein the nozzles associated with each wiper are directly mounted onto the wipers and thus move with the latter. Providing each wiper with a first group of nozzles is known, provided it is directed so as to enable the distribution of the liquid on one side of the wiper and a second group of nozzles is oriented so as to enable the distribution of the liquid on the other side of the wiper, with each group being alternately supplied with liquid depending whether the corresponding wiper is in the ascending phase or in the descending phase of the wiping. This ensures that the liquid is always distributed onto a zone of the windscreen which will immediately be wiped by the wiper. FIG. 5a illustrates this alternating motion through a plurality of arrows having opposite directions. For this particular configuration, according to the invention each flow path of the heating device will be used independently so as to enable the liquid to alternately enter one or the other of the two flow paths, depending on whether the two wipers of the associated windscreen wiping system are in an ascending or descending phase, and to distribute heated liquid simultaneously to both wipers in the ascending phase or in the descending phase. For this purpose, the liquid from the liquid tank (not shown) is brought via a bidirectional pump 4' through two parallel dotted lines $I_m$, $I_d$ for the inlet, each one being connected to one of the connection terminals of each one of the two flow paths, here respectively the connection terminals 11a, 11b. The pump is controlled by a microcontroller (not shown) so that the liquid alternately enters, depending on the direction of rotation of the pump 4', both flow paths. In the example shown here, the pump 4' makes it possible to supply the liquid to the connection tunnel 11a through the inlet duct $I_m$, when it is rotated in a direction associated with the ascending phase of the wipers, and makes it possible to supply the liquid to the connection terminal 11b through the inlet duct $I_d$ when it rotates in the other direction associated with the descending phase of the wipers. The remaining connection terminals of the two flow paths, here the terminals 12a, 12b, alternately distribute [the liquid], depending on the ascending or the descending phase, to the corresponding nozzles, and simultaneously for both wipers 3a, 3b through the two independent outlet ducts $O_m$, $O_d$ which are split in two parallel portions so that it can go to both wipers. Here again, the principle can easily be generalised to a wiping system having only one wiper, in which case both outlet conducts $O_m$, $O_d$ do not need being split in two parallel portions.

Figure 5B:
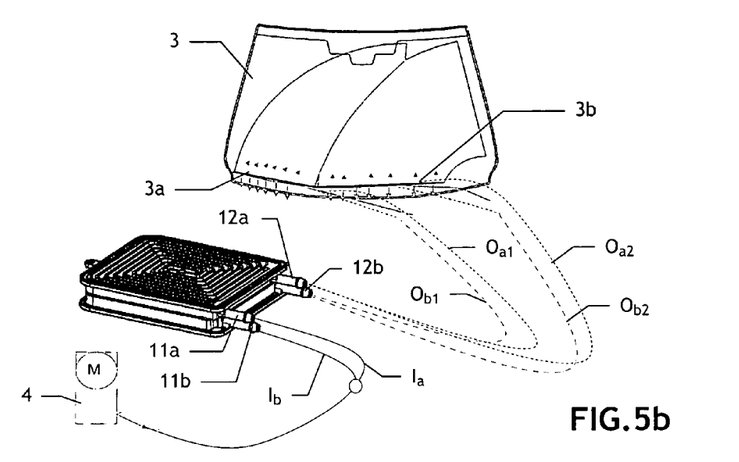

FIG. 5b is an alternative embodiment with respect to FIG. 5a. In this alternative solution, the groups of nozzles making it possible to distribute the liquid on either side of the wipers are simultaneously used, whether the wipers 3a, 3b are in the ascending phase or in the descending phase. Thus, it is provided to use both flow paths simultaneously, one being associated with the groups of nozzles of the wipers 3a, 3b enabling the spraying of the heated liquid on one side of the two wipers, the other being associated with the groups of nozzles of the wipers 3a, 3b enabling the spraying of the heated liquid on the other side of the two wipers. This alternative solution makes it possible to maximise the quantity of heated liquid sprayed onto the glass surface during a wiping cycle. For this purpose, the liquid coming from the liquid tank (not shown) is brought through a unidirectional pump 4 and simultaneously enters an inlet duct I split in two portions $I_a$, $I_b$, with each one of the two portions being connected to one of the connection terminals of each one of the two flow paths, here the connection terminals 11a, 11b. The remaining connection terminals of both flow paths, here the terminals 12a, 12b simultaneously distribute the liquid onto the two groups of nozzles associated with each one of the wipers via the outlet ducts $O_{a1}$, $O_{a2}$ for the first flow path, and $O_{b1}$, $O_{b2}$ for the second flow path.

Figure 6:
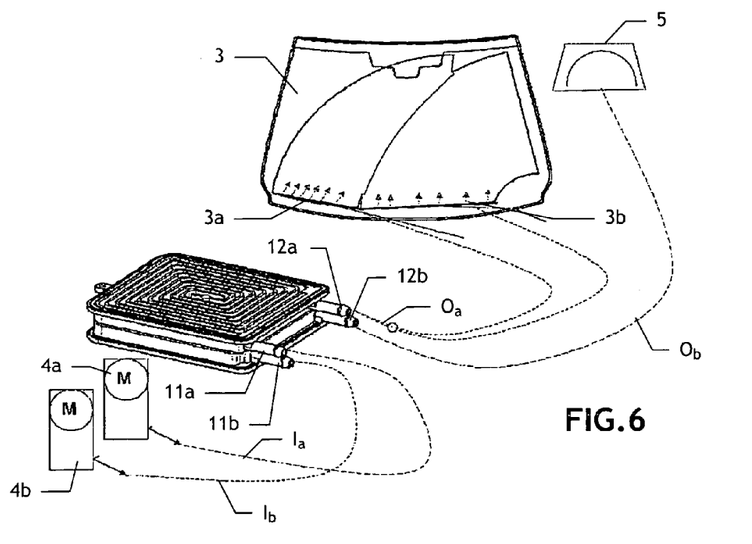
FIG. 6 illustrates a third possible utilisation of the device of the invention for the projection of a heated liquid on the one hand onto a windscreen in association with a front wiping system, and on the other hand onto a back window in association with a back wiping system.
Figure 7:
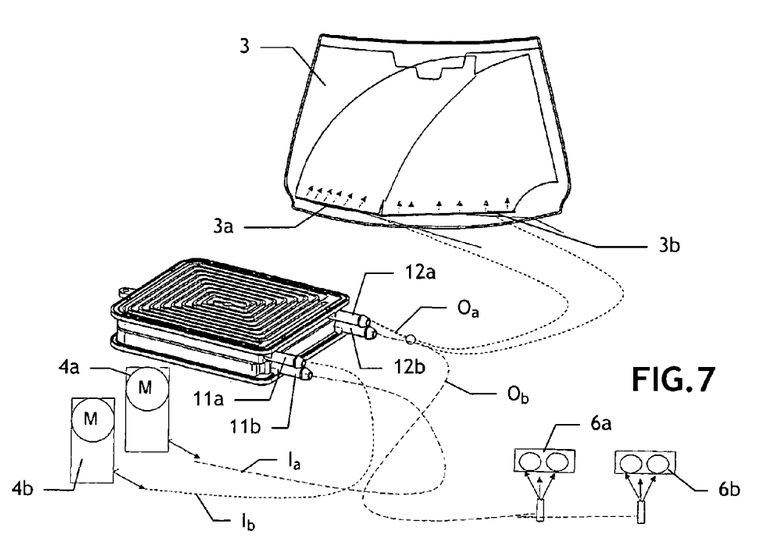
FIG. 7 illustrates a possible alternative utilisation of the device of the invention for the projection of a heated liquid on the one hand onto a windscreen in association with a front wiping system, and on the other hand onto the surfaces of the headlights in association with a headlight wiping system.

FIGS. 6 and 7 illustrate a third possible utilisation of the two independent systems including at least one nozzle. In this case, each flow path is used in association with one of the two systems, with one independent inlet circuit being connected to one of the connection terminals of the flow path and one independent outlet circuit being connected to one of the connection terminals of the flow path. More precisely, in the example as shown in FIG. 6, the flow path showing the connection terminals 11a, 12a is associated with a windscreen wiping system 3. For this purpose, one of the connection terminals thereof, here the terminal 11a, is connected to a unidirectional pump 4a through a single liquid inlet duct $I_a$ and the other connection terminal, here the terminal 12a, is connected to at least one nozzle associated to each one of the two wipers 3a, 3b through a single outlet duct $O_a$ split in two parallel portions to reach each one of the two wipers. Of course, the front wiping system could have only one wiper in which case the outlet duct $O_a$ needs not be split in two parts. The other flow path having the connection terminals 11b, 12b is associated with a rear window wiping system 5 conventionally having only one wiper. For this purpose, one of the connection terminals, here the terminal 11b, is connected to a unidirectional pump 4b through a single duct $I_b$ bringing liquid and the other connection terminal, here the terminal 12b, is connected to at least one nozzle associated with the rear window wiping system 5 through a single outlet duct $O_b$.

FIG. 7 illustrates the same principle as the one described in FIG. 6, but within the scope of the association of the heating device with, on the one hand, a windscreen wiping system 3, and on the other hand, a glass surfaces washing system 6a, 6b of both lamps and headlights provided on the automobile.

Figure 8:
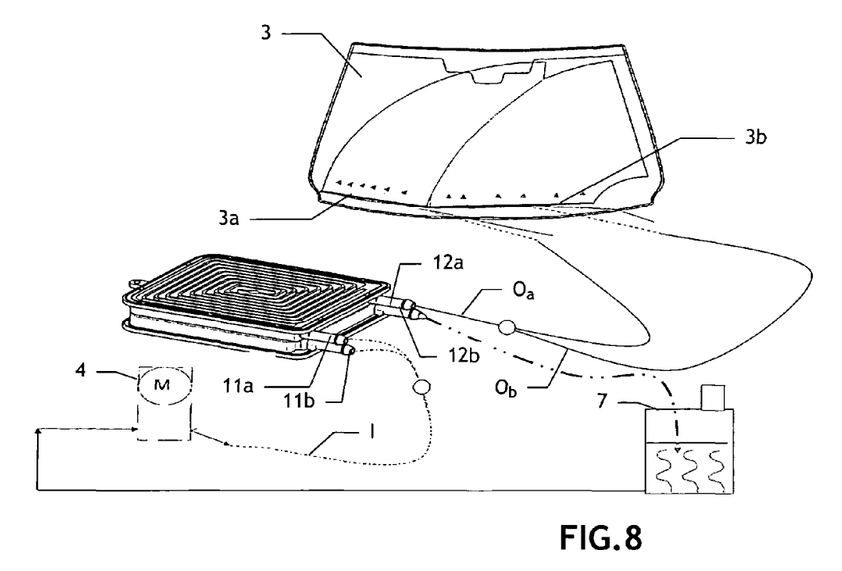
FIG. 8 illustrates a fourth possible utilisation of the device of the invention for on the one hand the projection of a heated liquid onto a windscreen in association with a front wiping system, and on the other hand for heating the liquid contained in the liquid tank.

Then, FIG. 8 schematically shows a fourth possible utilisation of the liquid heating device according to the invention, making it possible, on the one hand, to project a heated liquid onto the windscreen 3 in association with the front wiping system, and on the other hand the heating of the liquid contained in the liquid tank 7 which feeds the device. In this case, each flow path receives liquid from the tank 7 through a unidirectional pump 4 and a single liquid feeding duct I connected to the pump and split in two parts for the connection to two connection terminals, here the terminals 11a and 11b. One of the flow paths is associated to the wiping system only. Then, the other connection terminal, here the terminal 12a, is connected to the nozzles of the wiping system by an outlet duct $O_a$, possibly split in two parts in the case where the wiping system has, as shown, two wipers 3a, 3b. The other flow path is intended to deliver a heated liquid which returns to the tank 7. The outlet connection terminal thereof, here the terminal 12b is thus connected to the tank 7 through a single outlet duct $O_b$. Thanks to this utilisation, it is possible to advantageously equalize temperature in the whole circuit. This principle can be generalised to any wiping system of a glass surface provided on an automobile, such as a back window, or the surface of a headlight. This fourth utilisation is in fact rather similar to the one described while referring to FIG. 4 since the problem is in both cases the use of both flow paths of the heating device simultaneously for feeding two different destinations of the same system (i.e. the nozzles associated with each one of the two wipers for FIG. 4, or at least one nozzle and a liquid tank for FIG. 8).

Figure 9:
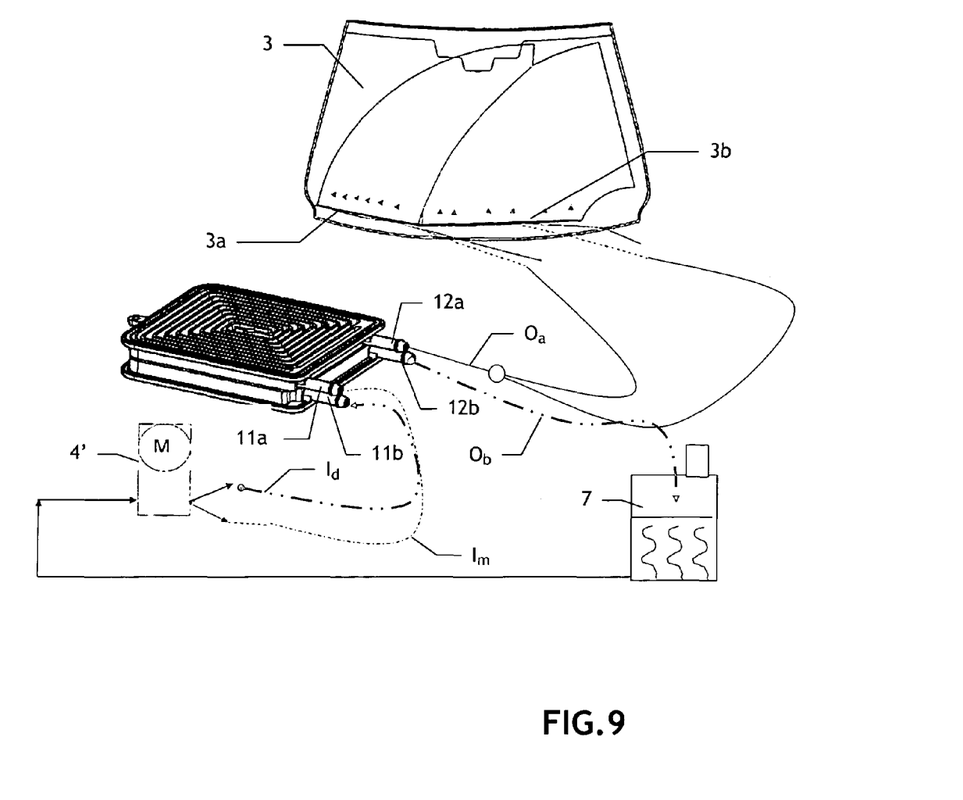
FIG. 9 illustrates an alternative embodiment of FIG. 8.

FIG. 9 is an alternative embodiment of FIG. 8 for the utilisation of the device enabling, on the one hand, the projection of a heated liquid onto a windscreen 3 in association with a front wiping system, and, on the other hand the heating of the liquid contained in the liquid tank 7 which feeds the device. Contrary to FIG. 8, the two flow paths are alternately used, one in association with one of the phases, here the ascending phase, of the wiping of the wipers 3a, 3b for delivering heated liquid to the nozzles of the wipers, the other one in association with the other phase, here the descending phase of the wiping of the wipers for delivering the heated liquid to the liquid tank 7. For this purpose, it is necessary to provide for a bidirectional pump 4' for feeding the inlet connection terminals, here the terminals 11a, 11b alternately depending on whether the phase is an ascending or a descending phase. The outlet connection terminal of the first flow path, here the terminal 12a, thus delivers the heated liquids to the nozzles associated with the two wipers 3a, 3b during the ascending phase for a split outlet duct $O_a$. The outlet connection terminal of the second flow path, here the terminal 12b, delivers the heated liquid to the tank 7 during the descending phase through the single inlet duct $O_b$.

Further to the hereabove described examples, it can be seen that the same liquid heating device according to the present invention has a wide range of possibilities as to the implementation thereof in a given automobile, with very few modifications.

Here, the two flow paths can be used:
- in series or in association with a single system provided with at least one nozzle for spraying heated liquid, for increasing heat exchange (FIG. 3),
- separately from each other, but simultaneously for delivering the heated liquid to two different destinations belonging to the same system (FIG. 4, 5b or 8),
- alternately for delivering the heated liquid to two different destinations of the same system (FIG. 5a, wherein both destinations are composed of two groups of nozzles associated with the ascending phase or with the descending phase of the wiping or FIG. 9 wherein one of the destinations is composed of the nozzles of the two wipers with the other destination corresponding to the tank),
- separately and independently from each other, in association with two independent systems (FIGS. 6 and 7).

The invention claimed is:

1. A liquid heating device for an automobile, comprising:
two liquid flow paths integrally formed in at least one part made of a heat-conducting material, each liquid flow path being capable of enabling a flow of liquid between a connection terminal defining an inlet and a connection terminal defining an outlet, with each one of the connection terminals being capable of sealingly receiving a liquid supply duct or tube; and
a heating means thermally coupled with said at least one part, wherein the heating means is capable of heating said at least one part so that the liquid flowing through said flow paths can absorb the heat of said at least one part; and
wherein the at least one part made of a heat-conducting material is also electrically conducting and conducts electricity to the heating means.

2. The liquid heating device according to claim 1, wherein the two paths are integrally formed in two distinct parts made of a heat-conducting material, each of the two distinct parts comprising a planar bottom wall extending in a plane parallel to the flow path that the part contains, and wherein the heating means comprises a matrix including a plurality of flat stones having a positive temperature coefficient positioned parallel between the planar bottom walls of said parts, in thermal contact with each one of said planar bottom walls.

3. The liquid heating device according to claim 2, wherein each flat stone of said matrix has a first surface capable of being electrically connected to a first direct voltage via a first electrode, and a second surface opposite the first one capable of being electrically connected to a second direct voltage via a second electrode.

4. The liquid heating device according to claim 3, wherein the first direct voltage comes from a battery of the automobile and the second voltage corresponds to a neutral voltage.

5. The liquid heating device according to claim 3, wherein faces of the plurality of flat stones of the matrix are in direct contact with both planar bottom walls of the two parts, and wherein each one of the two parts has an electrical connection terminal for receiving the first or the second direct voltage, said two parts respectively composing said first electrode and said second electrode.

6. The liquid heating device according to claim 3, wherein each one of said first and second electrodes is composed of a light deformable metal foil sandwiched between one of the surfaces of the plurality of flat stones of the matrix and the planar bottom wall of each one of the two parts, each foil having an electrical connection terminal for receiving the first or the second direct voltage.

7. An apparatus comprising:
a liquid heating device for an automobile comprising:
two liquid flow paths integrally formed in at least one part made of a heat-conducting material, each liquid flow path being capable of enabling a flow of liquid between a connection terminal defining an inlet and a connection terminal defining an outlet, with each one of the connection terminals being capable of sealingly receiving a liquid supply duct or tube;
a heating means thermally coupled with said at least one part, wherein the heating means is capable of heating said at least one part so that the liquid flowing through said flow paths can absorb the heat of said at least one part; and
wherein the at least one part made of a heat-conducting material is also electrically conducting and conducts electricity to the heating means;
a pump adapted to provide liquid to the liquid heating device; and
a windscreen wiping system including at least wiper adapted to project a liquid of a windscreen of the automobile.

8. The apparatus according to claim 7, wherein the liquid heating device is combined with a single system provided on the automobile, the single system comprising at least one nozzle, wherein one of the connection terminals of one of the flow paths is connected to the pump through a single liquid feeding duct and one of the connection terminals of the other flow path is connected to said nozzle through a single outlet duct, and wherein the flow paths are connected in series by a connection duct which connects the remaining connection terminals of both flow paths.

9. The apparatus according to claim 8, wherein said apparatus is a system for wiping a glass surface comprising two wipers, wherein said single outlet duct is split in two parallel portions each of the portions being connected to at least one nozzle associated with each wiper.

10. The apparatus according to claim 8, wherein said apparatus is a system for wiping a glass surface comprising the at least one wiper, with which the nozzle is associated.

11. The apparatus according to claim 10, wherein the apparatus is associated with two different destinations of the wiping system and requiring to receive a heated liquid, wherein both flow paths are connected to a unidirectional pump through an inlet duct and split in two parallel portions with each portion being connected to one of the connection terminals of each one of both flow paths, and wherein the remaining connection terminals of the two flow paths are connected to each one of the two different destinations through two independent outlet ducts.

12. The apparatus according to claim 11, wherein when the apparatus comprises at least two wipers, each one of the two different destinations is composed of at least one nozzle associated with each one of the wipers.

13. The apparatus according to claim 11, wherein when the apparatus comprises at least one nozzle capable of distributing a liquid taken from a liquid tank and heated by the device, one of the two different destinations is composed of said nozzle and the other one of the two different destinations is composed of said tank.

14. The apparatus according to claim 7, wherein the liquid heating device is associated with the windscreen wiping system comprising at least one wiper provided with at least one nozzle so as to enable the distribution of the liquid on a first side of the at least one wiper during an ascending phase of the wiping, and at least one nozzle for enabling the distribution of liquid on the other side of the at least one wiper during a descending phase of the wiping, wherein the connection terminal of each flow path is connected to a bidirectional pump through an inlet duct for alternately receiving liquid according to an ascending or descending phase of the wiping depending on the direction of the pump rotation, with each one of the remaining connection terminals of the two flow paths being connected to the corresponding nozzle of the wiper through an outlet duct.

15. The apparatus according to claim 14, wherein when the wiping system comprises two wipers, the outlet duct is split in two parallel portions, with each one of the two parallel portions being connected to at least one nozzle associated with each wiper.

16. The apparatus according to claim 7, wherein the liquid heating device is associated with two independent systems, each one including at least one nozzle, wherein each flow path is used in association with one of the two systems, with an independent inlet circuit connected to one of the connection terminals of the flow path and an independent outlet circuit connected to the other of the connection terminals of the flow path.

17. The apparatus according to claim 16, wherein one of the two independent systems is the windscreen wiping system including at least one wiper.

18. The apparatus according to claim 16, wherein one of the two independent systems is a back window wiping system.

19. The apparatus according to claim 16, wherein one of the two independent systems is a system for washing glass surfaces of automobile headlamps.

* * * * *